United States Patent Office 3,481,906
Patented Dec. 2, 1969

3,481,906
PROCESS FOR THE MANUFACTURE OF
POLYAMIDE POWDER
Minoru Maruyama and Masaru Nakasatomi, Nagoya,
Japan, assignors to Toyo Rayon Kabushiki Kaisha,
Tokyo, Japan, a corporation of Japan
Filed July 13, 1967, Ser. No. 653,171
Claims priority, application Japan, July 19, 1966,
41/46,771
Int. Cl. C08g 53/03
U.S. Cl. 260—78                                                8 Claims

ABSTRACT OF THE DISCLOSURE

Process for the manufacture of a polyamide powder, which comprises agitating a hydrophobic aliphatic polycarbonamides and an aqueous solution of a lactam while heating at a temperature not lower than the melting point of the said polyamide under the saturated vapour pressure at that temperature, to form a uniform mixture, and thereafter cooling the resulting mixture.

Figure 1:
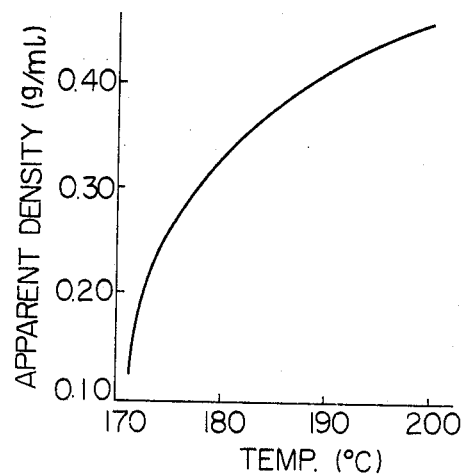

This invention relates to a process for the manufacture of a polyamide powder.

Many mechanical and chemical methods have been known so far to produce the powder of a polyamide to be used in shaping and coating. As the mechanical method, there is, for instance, a method of pulverising a polyamide mechanically in the presence of a chemically inert coolant. According to this method, however, it is impossible to control the shapes of the particles and is also difficult to control the particle size and the size distribution, and the method cannot be applied to a large scale production as it requires a great quantity of a coolant. On the other hand, examples of the chemical method are (1) a method of powdering during a polymerisation step, i.e., a method of obtaining powder by effecting bulk polymerisation or solution polymerisation at a temperature below the melting point of polyamide, (2) a method of obtaining powder by dissolving a polyamide into a solvent for it at room temperature such as mineral acid, formic acid and phenol, and reprecipitating the polyamide upon addition of a non-solvent, and (3,) a method of obtaining powder by dissolving a polyamide in alcohols or glycols which are non-solvent for the polyamide at room temperature but solvent at high temperatures, and cooling it to room temperature. Method (1), however, has defects of involving colouration, and lowering the degree of polymerisation and the rate of polymerisation. Method (2) meets with difficulties such as chemical deterioration, for example, colouration an decomposition owing to insufficient desolvation, and extreme difficulty of controlling the powdery characteristics such as apparent density, particle shape, particle diameter and size distribution. Method (3) is also attended with disadvantages in that it is difficult to obtain a powder or excellent quality as the solvent such as alcohols and ketones is considerably active at high temperatures and involves a substantial colouration and decomposition and there is difficulty in the recovery of a solvent. Thus, every one of these methods is poor in practical value.

The inventors of this invention previously found that a polyamide powder of excellent quality can be obtained, without the defects of the prior arts, by agitating a polyamide and an aqueous solutions of a lactam while heating at a temperature lower than the melting point of the said polyamide, or a temperature at which the polyamide is substantially melted, but not lower than a temperature at which the polyamide becomes flowable in the said aqueous lactam solution, under the saturated vapour pressure at that temperature to form a uniform mixture, and then cooling the resulting mixture. They have already filed a patent application for this method. According to this method, it is possible to greatly control the particle size, size distribution, particle shape and apparent density of the resulting powder.

In fact, the application of this method to polyamides having a large amido-linkage content such as nylon 6 and nylon 66, that is, polyamides showing a remarkable fall in melting point in the aqueous lactam solution owing to the large amido-linkage content gave polyamide powders having satisfactory characteristics. When, however, this process is applied to polyamides poor in hydrophilicity at a heating temperature below the melting point, in other words, polyamides showing a little fall of melting point in the aqueous lactam solution, there can only be obtained a powder linear in shape and having a small apparent density and a small average particle size.

Accordingly, a chief object of this invention is to provide a process for the manufacture of a polyamide powder having the desired powder properties from a polyamide poor in hydrophilicity. The researches of the inventors have led to the discovery that by adjusting the heating temperatures in the said process to above the melting point of a polymer, a polyamide powder of nearly spherical shape having a sufficiently large apparent density can be obtained.

The process of this invention comprises agitating a polyamide poor in hydrophilicity and an aqueous solution of a lactam while heating at a temperature not lower than the melting point of the said polyamide, under the saturated vapour pressure at that temperature, to form a uniform mixture, and then cooling the resulting mixture.

The polyamide poor in hydrophilicity used in this invention is the polyamide showing a little fall in melting point in the aqueous lactam solution as mentioned above, in other words, a polyamide having a small difference between its melting point in the aqueous lactam solution or a temperature at which the polyamide becomes flowable therein, and its inherent melting point or a temperature at which it becomes flowable, and refers to polyamides having a relatively low amido-linkage in the recurring unit of polyamide. These polyamides, in the form of either melt or solid, can be mixed with an aqueous solution of a lactam. The polyamides poor in hydrophilicity employed in accordance with the present invention are hydrophobic, aliphatic polycarbonamides as exemplified in the specific examples by polydodecanamide and polyundecanamide, i.e., nylon 12 and nylon 11.

As the usable lactam, there can be mentioned ω-lactams having not more than 12 carbon atoms, namely, γ-butanolactam, δ-pentanolactam, ε-hexanolactam, ζ-heptanolactam, η-octanolactam, θ-nonanolactam, ω-decano-, undecano- and dodecanolactam, their chlorine- and vinyl-substitution products, and mixtures of two or more of these. The concentration of the usable aqueous solution of a lactam is 60 to 95% by weight, preferably 70 to 85% by weight. The mixing of the polyamide with the aqueous lactam solution need be effected to an extent such that the polyamide is dissolved in the aqueous lactam solution or is uniformly dispersed therein in an emulsion form. The polyamide is used, in an amount, based on the total weight of it, of 1 to $\frac{1}{30}$ part, preferably ½ to $\frac{1}{10}$ part, per part of the aqueous lactam solution.

The preferable heating temperature is 0 to 30° C. higher than the melting point of the polyamide.

It is preferable that cooling should be relatively rapidly carried out, for instance, at a rate of not less than 20° C./min. It is more advantageous to carry out cooling by further adding an aqueous solution of lactam from outside the reaction system than to remove heat from outside. The reason for this is that according to the method of removing heat from outside, a polymer film is formed on the surface to be cooled and gives rise to a remarkable decrease in the yield of powder, and incident to this phenomenon, heat transmission becomes poor and a cooling rate cannot be controlled as desired.

Another advantage of this invention is that the process of this invention can be applied to the manufacture of the powder of a polyamide containing such an additive as pigment, photostabiliser, heat-stabiliser and weathering agent for the improvement of the properties of the polyamide. A polyamide powder with the desired powdery characteristics and having other properties improved by the use of an additive can be obtained by agitating a polyamide poor in hydrophilicity, an aqueous solution of a lactam and an additive while heating at a temperature not lower than the melting point of the said polyamide, or a temperature at which the polyamide is substantially melted, but not lower than a temperature at which the polyamide becomes flowable in the said aqueous lactam solution, under the saturated vapour pressure at that temperature, to form a uniform mixture, and then cooling the resulting mixture.

The effects to be given by the process of this invention will now be described with reference to the accompanying drawings.

Figure 2:
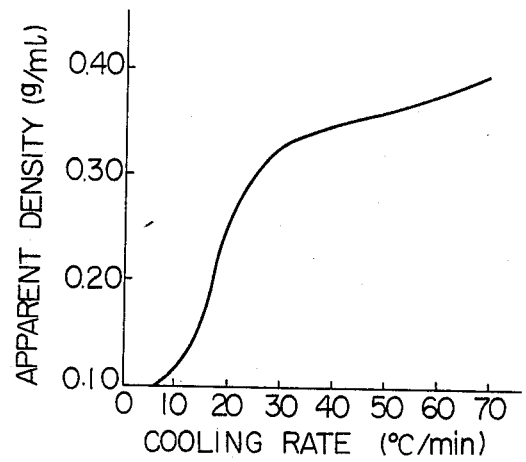
Figure 3:
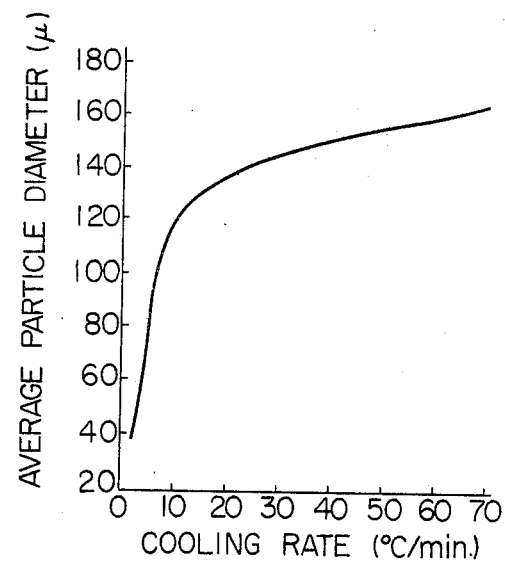

FIG. 1 shows the heating temperature (° C.) and the apparent density of a final polyamide powder (g./ml.) when the process is carried out by using an 80% ε-caprolactam aqueous solution as solvent and polydodecanamide as polyamide, which are plotted on the abscissa and the ordinate, respectively. FIG. 2 shows the cooling rate (° C./min.) and the apparent density (g./ml.) of a final polyamide powder when the process is carried out by using an 80% ε-caprolactam aqueous solution as solvent and polydodecanamide as polyamide, which are respectively plotted on the abscissa and the ordinate. FIG. 3 shows the cooling rate (° C./min.) and the average particle diameter ($\mu$) of a final polyamide powder when the polyamide powder is produced under the same conditions as in FIG. 2, which are plotted on the abscissa and the ordinate, respectively.

FIG. 1 indicates that heating at a temperature below the melting point of the polyamide is undesirable because of a small apparent density of the resulting powder, and that the apparent density gets larger as the heating temperature becomes higher above the melting point. But the heating to a temperature 30° C. higher than the melting point is undesirable because of occurrence of hydrolysis during the treatment. It can be understood from FIGS. 2 and 3 that the apparent density and average particle diameter of a final polyamide powder are greatly affected by the cooling rate. Namely, both of these graph show that a preferable cooling rate to obtain the intended effects is not lower than 20° C./min.

Now, the invention will be described further by examples, by which the invention is in no way limited.

COMPARATIVE EXAMPLE

One-litre autoclave was charged with 50 g. of polydodecanamide having a melting point of 175° C. and 200 g. of an 80% aqueous ε-caprolactam solution, and heated to a temperature of 170° C. while agitating. The mixture was maintained at this temperature for about 5 minutes, and 800 g. of an aqueous solution of ε-caprolactam was slowly added over a period of 60 minutes. The resulting slurry was filtered, washed with a hot water, and dried to give 49 g. of a pure white powder, which had an apparent density of 0.08 g./ml., an average particle diameter of 40.3$\mu$ and an angle of repose of about 62°. An attempt to form a fluidised bed failed because of the occurrence of channelling. The relative viscosity ($\eta_r$) and the methanol-extracted component before the powdering treatment were 1.84 and 1.98%, while those after the treatment were 1.85 and 0.12%, respectively.

EXAMPLE 1

The same autoclave as used in comparative example was charged with 50 g. of polydodecanamide and 300 g. of an 80% ε-caprolactam aqueous solution, then heated to a temperature of 190° C. while agitating. The resulting mixture was cooled by adding 200 g. of an 80% ε-caprolactam aqueous solution over a period of one minute. The same treatment of the obtained slurry as in comparative example gave 49 g. of a pure white polydodecanamide powder, which had an apparent density of 0.397 g./ml., an average particle diameter of 152.2$\mu$, and an angle of repose of 30.3°. The powder was dry, and its fluidised bed was easily formed. The relative viscosity ($\eta_r$) and the methanol-extracted component before the powdering treatment were 1.84 and 1.98%, respectively, and those after the treatment were 1.76 and 0.08%, respectively.

EXAMPLE 2

The same autoclave as used in comparative example was charged with 50 g. of polyundecanamide having a melting point of 185° C. and 250 g. of 73% ε-caprolactam aqueous solution, and heated to a temperature of 200° C. The mixture was cooled by adding 250 g. of a 73% ε-caprolactam aqueous solution over a period of about 3 minutes. The same treatment of the obtained slurry as in comparative example gave 48.5 g. of a pure white polyundecanamide powder, which had an apparent density of 0.354 g./ml., an average particle diameter of 123.4$\mu$ and an angle of repose of 30.4°, and could be used for fluidized bed coating and melt-spray coating without any classification, and relative viscosity ($\eta_r$) and the methanol-extracted component before the powdering treatment were 1.89 and 1.72%, while those after the treatment were 1.81 and 0.05%, respectively.

What is claimed is:

1. A process for the manufacture of a polyamide powder, which comprises agitating a hydrophobic aliphatic polycarbonamide and an aqueous solution of a lactam while heating at a temperature not lower than the melting point of the said polycarbonamide under the saturated vapour pressure at that temperature, to form a uniform mixture, and thereafter cooling the resulting mixture.

2. The process according to claim 1 in which said polycarbonamide is a polycarbonamide having not less than 9 carbon atoms per one amido-linkage in the recurring unit of the polycarbonamide.

3. The process according to claim 1 in which the heating is effected at a temperature 0 to 30° C. higher than the melting point of the polycarbonamide.

4. The process according to claim 1 in which the concentration of the aqueous lactam solution is 60 to 95% by weight, preferably 70 to 85% by weight.

5. The process according to claim 1 in which the lactam used is, ω-lactam having not more than 12 carbon atoms, its chlorine- or vinyl substitution product, or a mixture of two or more of these.

6. The process according to claim 1 in which ε-caprolactam is used as the lactam.

7. The process according to claim 1 in which the cooling is effected by the addition of an aqueous solution of caprolactam.

8. The process according to claim 1 in which the cooling is effected at a rate not lower than 20° C./min.

References Cited

UNITED STATES PATENTS 3,130,181  4/1964  Sievenpiper _____ 260—78
3,377,323  4/1968  Ioka et al. _____ 260—78

HAROLD D. ANDERSON, Primary Examiner

U.S. Cl. X.R.

260—96